(12) United States Patent
Omet et al.

(10) Patent No.: US 7,852,060 B2
(45) Date of Patent: Dec. 14, 2010

(54) METHOD OF FORMING A BUCK-BOOST MODE POWER SUPPLY CONTROLLER AND STRUCTURE THEREFOR

(75) Inventors: Dominique Omet, Cugnaux (FR); Rémy Saphon, Toulouse (FR)

(73) Assignee: Semiconductor Components Industries, LLC, Phoenix, AZ (US)

( * ) Notice: Subject to any disclaimer, the term of this patent is extended or adjusted under 35 U.S.C. 154(b) by 672 days.

(21) Appl. No.: 11/816,699

(22) PCT Filed: Aug. 17, 2005

(86) PCT No.: PCT/US2005/029468
§ 371 (c)(1),
(2), (4) Date: Aug. 20, 2007

(87) PCT Pub. No.: WO2007/021282
PCT Pub. Date: Feb. 22, 2007

(65) Prior Publication Data
US 2008/0252276 A1    Oct. 16, 2008

(51) Int. Cl.
G05F 1/40 (2006.01)
G05F 1/24 (2006.01)
(52) U.S. Cl. .................. 323/285; 323/225; 323/259; 323/284
(58) Field of Classification Search ......... 323/282–285, 323/351, 222, 225, 259
See application file for complete search history.

(56) References Cited

U.S. PATENT DOCUMENTS

| | | | |
|---|---|---|---|
| 6,037,755 A * | 3/2000 | Mao et al. | 323/222 |
| 6,348,779 B1 * | 2/2002 | Sluijs | 323/222 |
| 6,400,213 B2 * | 6/2002 | Shih et al. | 327/540 |
| 7,265,524 B2 * | 9/2007 | Jordan et al. | 323/225 |
| 7,466,112 B2 * | 12/2008 | Zhou et al. | 323/259 |
| 2005/0093526 A1 * | 5/2005 | Notman | 323/282 |

* cited by examiner

Primary Examiner—Jessica Han
(74) Attorney, Agent, or Firm—Robert F. Hightower

(57) ABSTRACT

In one embodiment, a power supply controller is configured to operate a plurality of switches in a buck-boost mode to control an output voltage wherein at least one switch of the plurality of switches is enabled for a substantially fixed portion of a cycle of the buck-boost mode.

22 Claims, 3 Drawing Sheets

US 7,852,060 B2

METHOD OF FORMING A BUCK-BOOST MODE POWER SUPPLY CONTROLLER AND STRUCTURE THEREFOR

BACKGROUND OF THE INVENTION

The present invention relates, in general, to electronics, and more particularly, to methods of forming semiconductor devices and structure.

In the past, the semiconductor industry utilized various methods and structures for implementing switching power supply controllers such as pulse width modulated (PWM) power supply controllers. The system that used the switching power supply controllers generally was configured as either a voltage boost system or a voltage buck system. Some systems were implemented as both a buck and a boost system or a buck-boost system. One example of such a buck-boost system is disclosed in U.S. Pat. No. 6,166,527 issued to Dwelley et al on Dec. 26, 2000. One problem with such a buck-boost system was that the efficiency in the buck-boost mode generally was not as high as desired. Additionally, the circuitry used to implement the buck-boost system generally was complex which resulted in a high cost.

Accordingly, it is desirable to have a switching power supply controller that can operate in a buck-boost operating mode, that has a high efficiency, that has a simpler implementation, and that has a reduced cost.

For simplicity and clarity of illustration, elements in the figures are not necessarily to scale, and the same reference numbers in different figures denote the same elements. Additionally, descriptions and details of well-known steps and elements are omitted for simplicity of the description. As used herein current carrying electrode means an element of a device that carries current through the device such as a source or a drain of an MOS transistor or an emitter or a collector of a bipolar transistor or a cathode or anode of a diode, and a control electrode means an element of the device that controls current through the device such as a gate of an MOS transistor or a base of a bipolar transistor. Although the devices are explained herein as certain N-channel or P-Channel devices, a person of ordinary skill in the art will appreciate that complementary devices are also possible in accordance with the present invention. It will be appreciated by those skilled in the art that the words during, while, and when as used herein are not exact terms that mean an action takes place instantly upon an initiating action but that there may be some small but reasonable delay between the reaction that is initiated by the initial action.

DETAILED DESCRIPTION OF THE DRAWINGS

Figure 1:
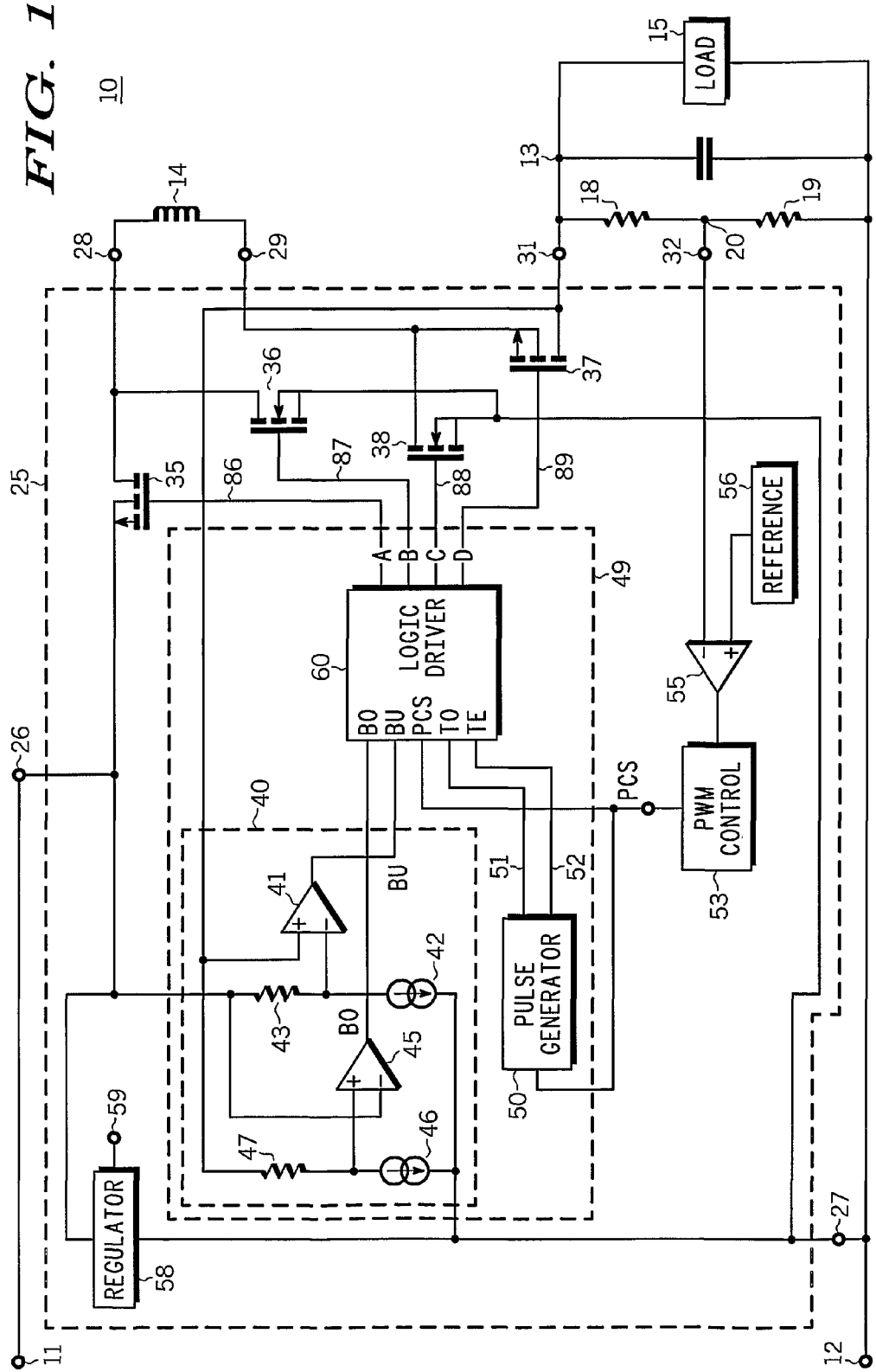
FIG. 1 schematically illustrates an embodiment of a buck-boost power supply system that has a buck-boost power supply controller in accordance with the present invention.

FIG. 1 schematically illustrates an embodiment of a portion of a power supply system 10 that has an exemplary form of a power supply controller 25. Controller 25 receives a signal having multiple signal levels representing multiple functional states.

Power supply system 10 typically receives power from a bulk voltage between a power input terminal 11 and a power return terminal 12 and forms an output voltage between an output node 13 and terminal 12. A load 15 may be connected to receive the output voltage and a load current from output node 13 and terminal 12. The bulk voltage applied between terminals 11 and 12 may be a dc voltage or a rectified ac voltage such as a half-wave rectified sine-wave. System 10 typically includes an inductor 14 that is controlled by controller 25 to form the output voltage. System 10 also generally includes a feedback network, illustrated by series coupled resistors 18 and 19, that is utilized provide a sense signal, such as a feedback (FB) signal, that is representative of the value of the output voltage between output node 13 and terminal 12. The sense signal is formed at a sense node 20. Such feedback (FB) networks and feedback (FB) signals are well known to those skilled in the art.

The exemplary form of controller 25 illustrated in FIG. 1 generally receives power from the bulk voltage between a voltage input 26 and a voltage return 27. Input 26 generally is connected to terminal 11 and return 27 typically is connected to terminal 12. Inductor 14 is connected to inductor inputs 28 and 29 of controller 25. Controller 25 usually includes a switch control section 49, a PWM control section 53, an error amplifier 55, a reference generator or reference 56, an internal regulator or regulator 58, and a plurality of power switches such as a first power transistor 35, a second power transistor 36, a third power transistor 37, and a fourth power transistor 38. Regulator 58 generally is connected between input 26 and return 27 to receive the input voltage from input 26. Regulator 58 forms an internal operating voltage on an output 59 that is utilized for operating other elements of controller 25 including switch control section 49, PWM control section 53, reference 56, and error amplifier 55. Error amplifier 55 receives the sense signal, such as the feedback (FB) signal, on a sense input 32 and forms an error signal on output of amplifier 55 that is representative of the difference between the value of the output voltage and the desired value of the output voltage. PWM control section 53 receives the error signal from amplifier 55 and responsively forms a PWM control (PCS) signal that is utilized for operating transistors 35-38 in order to regulate the value of the output voltage. PWM control section 53 can have a variety of implementations that are well known to those skilled in the art. One example of a suitable PWM control section is disclosed in U.S. Pat. No. 5,859,768 issued to Jefferson Hall et al on Jan. 12, 1999 which is hereby incorporated herein by reference. In the preferred embodiment, section 53 is a fixed frequency current mode PWM controller, thus, the PCS signal has a fixed frequency and the duty cycle is determined by the value of the output voltage as is well known to those skilled in the art.

As will be seen further hereinafter, controller 25 is configured to operate system 10 in either a buck mode, a boost mode, or a buck-boost mode. Section 49 is configured to set the operating mode of controller 25 and use the PCS signal to control the functionality of the selected operating mode. Section 49 is configured to operate system 10 in the boost mode by enabling transistor 35, disabling transistor 36, and use the PCS signal to switch transistors 37 and 38 responsively to the value of the output voltage. Section 49 is configured to operate system 10 in the buck mode by enabling transistor 37, disabling transistor 38, and using the PCS signal to switch transistors 35 and 36 responsively to the value of the output voltage. In the buck-boost mode, section 49 is configured to form one cycle of the buck-boost mode into three portions. During one portion of the buck-boost mode cycle, section 49 is configured to couple inductor 14 to receive the input voltage from input 26. During the second portion of the buck-boost mode cycle, section 49 is configured to couple inductor 14 to supply power to output node 13 and load 15, and during a third portion of the buck-boost mode cycle, section 49 is configured to couple inductor 14 to both receive power from input 26 and to couple power to output node 13 and load 15. During one of these three portions of the buck-boost mode operating cycle, one of transistors 35-38 is enabled for a fixed portion of the buck-boost mode cycle. In the other two portions of the buck-boost mode cycle, the PCS signal is used to control transistors 35-38. The fixed portion is selected to be a fixed percent of the period of the cycle. For example a fixed amount of time or a fixed percent of the period of the cycle. If the fixed amount of time is too short or the fixed percent is too low, it becomes difficult to accurately regulate the value of the output voltage.

The exemplary embodiment of switching control section 49 illustrated in FIG. 1 includes a mode detection circuit or mode detector 40, a pulse generator 50, and a logic/driver or logic/driver block 60. Pulse generator 50 receives the PCS signal from PWM control section 53 and forms two pulse signals that assist in forming the three portions of the buck-boost cycle. Generator 50 receives the PCS signal and responsively forms a TO pulse signal on an output 51 and forms a TE pulse signal on an output 52. Mode detector 40 receives the input voltage and the output voltage and responsively forms control signals that are utilized to set the operating mode of controller 25. A buck control (BU) signal is asserted to indicate controller 25 should be operating in the buck operating mode and a boost control (BO) signal is asserted to indicate controller 25 should be operating in the boost operating mode. Detector 40 negates both the BU and BO signals to indicate controller 25 should operate in the buck-boost operating mode. In the exemplary embodiment illustrated in FIG. 1, detector 40 includes a boost comparator 45, a boost current source 46, a boost resistor 47, a buck reference comparator 41, a buck current source 42, and a buck resistor 43. If the value of the input voltage minus the value of the output voltage is greater than a first threshold established by current source 42 and resistor 43, the output of comparator 41 is high to assert the buck control (BU) signal. If the value of the input voltage minus the value the output voltage is less than a second threshold set by current source 46 and resistor 47, the output of comparator 45 is high forcing the boost control (BO) signal high to assert the boost control (BO) signal. If the input voltage minus value of the output voltage is less than the first threshold but greater than the second threshold, the output of comparators 41 and 45 are both low forcing both the BU and BO signals low indicating that controller 25 should be operating in the buck-boost mode thereby asserting the buck-boost mode. The range between the first and second threshold values is selected to be narrow enough to provide maximum advantage of the buck-boost operation mode described herein and wide enough to provide sufficient time for each PWM cycle. In the preferred embodiment, the difference between the first threshold and the second threshold value is approximately 1.3 volts. However, the range could be larger or smaller.

Figure 2:
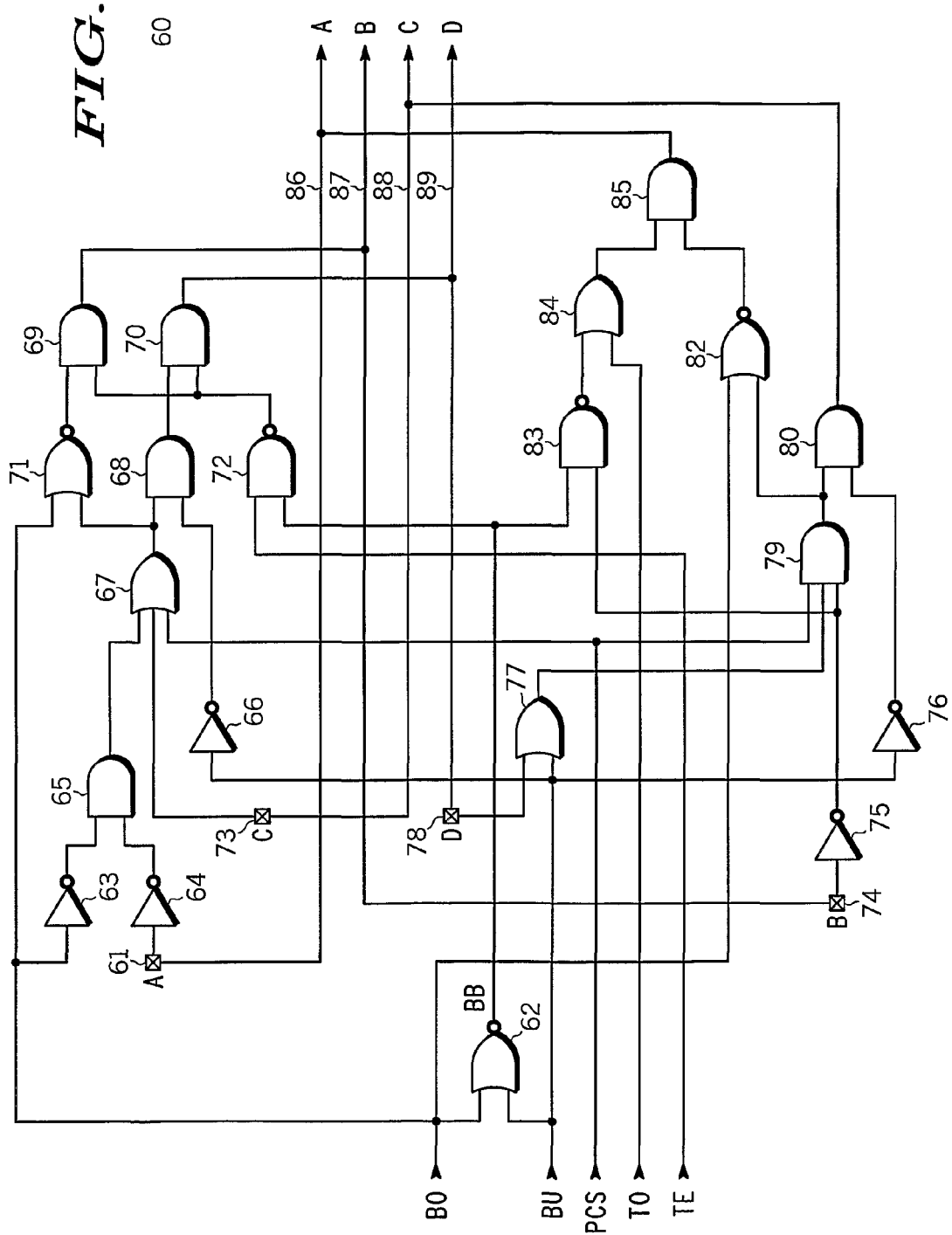
FIG. 2 schematically illustrates an embodiment of a portion of the buck-boost power supply controller of FIG. 1 in accordance with the present invention.

FIG. 2 schematically illustrates an exemplary embodiment of the logic within block 60. Block 60 receives the BU and BO signals and uses the state of the BU and BO signals to set the operating state of controller 25 and for controlling the operation of transistors 35-38. Block 60 also receives the PCS signal from section 53 and pulse control signals TO and TE from generator 50. Block 60 has outputs 86, 87, 88, and 89 on which block 60 forms respective drive signal A, B, C, and D, that are used to drive respective transistors 35, 36, 37, and 38. The exemplary embodiment of block 60 illustrated in FIG. 2 includes AND gates 65, 68, 69, 70, 79, 80, and 85; NAND gates 72 and 83; inverters 63, 64, 66, 75, and 76; OR gates 67, 77, and 85; and NOR gates 62, 71, and 82. This description has references to FIG. 1 and FIG. 2.

In operation if the value of input voltage minus the output voltage is greater than the first threshold value, controller 25 operates in the buck mode. Detector 40 asserts the BU signal and negates the BO signal. Block 60 receives the BO and BU signals. The high BU signal forces the output of gate 62 low thereby forcing the buck-boost (BB) signal low. The low from gate 62 forces the output of gate 72 high to enable gates 69 and 70, and also forces the output of gates 83 and 84 high to enable one input of gate 85. The high BU signal forces the output of gate 77 high to enable one input of gate 79. The high BU signal also forces the output of inverters 66 and 76 low. The low from inverter 76 forces the output of gate 80, thus the C drive signal, low to disable transistor 36. The low from the C drive signal is delayed by a delay element or delay 73 and is received by gate 67 to enable one input of gate 67. The low from inverter 66 forces the output of gate 68 low which also forces the output of gate 70, thus the D drive signal on output 89, low to enable transistor Enabling transistor 37 couples input 29, thus one terminal of inductor 14, to output 31 of controller 25, thus to output node 13. The low from the D drive signal is delayed by a delay element or delay 78 and is received by an input of gate 77 but has no effect on gate 77. The low BO signal forces the output of inverter 63 high to enable one input of gate 65 and also enables one input of gates 80 and 82. When PWM control section 53 forces the PCS signal high to initiate a cycle of the boost operating mode, the high PCS signal forces the output of gate 67 high. The high from gate 67 forces the output of gate 71 low thereby forcing the output of gate 69, thus the B drive signal on output 87, low. The low B drive signal is received by delay 74 which delays the B drive signal before it is received by inverter 75. The low from delay 74 forces the output of inverter 75 high which is received by gate 79. Since the PCS signal is also high, the high from inverter 75 forces the output of gate 79 high. The high from gate 79 forces the output of gate 82 low thereby forcing the output of gate 85, thus output 86 and the A drive signal, low. The low A drive signal enables transistor 35. The low A drive signal also is received by delay 61 which delays the low signal before it is received by inverter 64 thereby forcing the output of inverter 64 high. Since the other input of gate 65 is already high, the high from inverter 64 forces the output of gate 65 high which has no effect on gate 67 since the input is already high. Thus, it can be seen that the positive going PCS signal forces the A drive signal low thereby enabling transistor 35. Enabling transistor 35 couples input 28, thus inductor 14, to receive power from input 26. Because transistors 35 and 37 are enabled, current flows from input 26 through transistor 35, through input 28 to inductor 14, through input 29 and transistor 37 to output 31 and output node 13 in order to supply current to load 15.

Transistor 35 remains enabled until the sense signal on input 32 forces section 53 to negate the PCS signal. The falling edge of the PCS signal is received by generator 50 which responsively generates an output pulse of a fixed width on the TO output. The fixed pulse width may be implemented by a variety of well-known pulse generation circuits such as a one-shot or other equivalent circuits. For example, the pulse width may be formed as a fixed percent of the duration of each cycle formed by control 53 such as by using a counter driven by an oscillator used to form the cycle. The positive going TO signal is received by gate 84 which has no effect since the other input of gate 84 is already high. When the fixed pulse width from the TO signal goes low, generator 50 forces the TE signal high for the remainder of the PCS cycle until the PCS signal once again goes high. The TE signal may be generated from the TO and PCS signals by simple logic circuits such as a NOR gate. The high going TE signal is received by gate 72 which has no affect since the other input of gate 72 is low. The low going PCS signal is also received by block 60. The low PCS signal forces the output of gate 79 low which forces the output of gate 82 high. The high from gate 82 is received by gate 85 and forces the output high since the other input of gate 85 is already high. The high from gate 85 forces the A drive signal high to disable transistor 35. The high on output 86 is received by delay 61 which delays the high signal before it is received by inverter 64. The high from delay 61 forces the output of inverter 64 low thereby forcing the output of gate 65 low. Since the PCS signal has forced the other input of gate 67 low, the low from gate 65 forces the output of gate 67 low thereby forcing the output of gate 71 high. Since the other input of gate 69 is high, the high from gate 71 forces the output of gate 69, thus the B drive signal on output 87, high thereby enabling transistor 36. Enabling transistor 36 couples input 28, thus one terminal of inductor 14, to return 27 in order to begin discharging inductor 14. The high B drive signal is received by delay 74 which delays the high B drive signal before it is received by inverter 75. The high forces the output of inverter 75 low which has no effect on gate 79 since the PCS signal is already low. Thus, the low portion of the PCS signal negates the A drive signal and asserts the B drive signal thereby disabling transistor 35 and enabling transistor 36. As can be seen that in the boost operating mode, the high BU signal forces both the C and the D drive signals low to enable transistor 37 and to disable transistor 38 and switches transistors 35 and 36 responsively to the PCS signal. Since the PCS signal switches responsively to the value the output voltage, controller 25 switches transistors 35 and 36 responsively to the value of the output voltage.

If the value of the input voltage minus the value of the output voltage is less than the second threshold value, controller 25 operates in the boost mode. Detector 40 asserts the boost (BO) signal and negates the buck (BU) signal. The high BO signal forces the output of gate 62 low thereby forcing the buck-boost (BB) signal low. The low from gate 62 forces the output of gate 72 high to enable gates 69 and 70, and also forces the output of gates 83 and 84 high to enable one input of a gate 86. The low BU signal forces the output of inverter 66 high to enable on input of gate 68. The low BU signal also enables one input of gate 77 and forces the output of inverter 76 high. The high from inverter 76 enables one input of gate 80. The high BO signal forces the output of inverter 63 low thereby forcing the output of gate 65 low to enable one input of gate 67. The high BO signal also forces the output of gate 82 low thereby forcing the output of gate 85, thus the A drive signal on output 86, low. The low A drive signal enables transistor 35 to couple input 28, thus one terminal of inductor 14, to receive power from input 26. The low A drive signal is also received by delay 61 which delays the low signal before applying it to the input of inverter 64. The low from delay 61 forces the output of inverter 64 high which has no effect on gate 65 because the other input is low. The high BO signal also forces the output of gate 71 low thereby forcing the output of gate 69, thus the B drive signal an output 87, low to disable transistor 36. The low B drive signal is received by delay 74 which delays the low signal before applying it to the input of inverter 75. The low from delay 74 forces the output of inverter 75 high which is received by one input of gate 79 to enable another input of gate 79.

As section 53 forces the PCS signal high, the high forces the output of gate 67 high. The high from gate 67 is received by gate 68 thereby forcing the output high because the other input of gate 68 is already high. The high from gate 68 forces the output of gate 70 high because the other input is already high. The high from gate 70 forces the D drive signal on output 89 high thereby disabling transistor 37. The high D drive signal is received by delay 78 which delays it before applying the high to the input of gate 77. The high forces the output of gate 77 high which is received by gate 79. Since the PCS signal is already high, the high from gate 77 forces the output of gate 79 high. The high from gate 79 forces the output of gate 80 high because the other input of gate 80 is already high. The high from gate 80 forces the C drive signal on output 88 high thereby enabling transistor 38. Enabling transistor 38 couples input 29, thus one terminal of inductor 14, to return 27 to charge inductor 14. The high C drive signal is received by delay 73 which delays the high before applying it to the input of gate 67 which has no effect on gate 67 since one input is already high.

Transistor 38 remains enabled until the sense signal on input 32 forces section 53 to negate the PCS signal. The falling edge of the PCS signal is received by generator 50 which responsively asserts the fixed pulse width TO signal followed by the TE signal. The TO signal has no affect on gate 84 because the other input is already high. The high going TE signal is received by gate 72 which has no affect since the other input of gate 72 is low. The low PCS signal forces the output of gate 79 low thereby forcing the output of gate 80 and the C drive signal low thereby disabling transistor 38. The low C drive signal is received by delay 73 which delays the low before applying into the input of gate 67. Since the PCS signal is also low, the low from delay 73 forces the output of gate 67 low thereby forcing the output of gate 68 low. The low from gate 68 forces the output of gate 70 low thereby forcing the D drive signal low and enabling transistor 37 to couple output 31 to input 29 and to one terminal of inductor 14. The low D drive signal is also received by delay 78 which delays the low signal before applying it to one input of gate 77. Since the other input of gate 77 is already low, the low from delay 78 forces the output of gate 77 low which has no effect on gate 79 because the PCS signal is low. Thus, it can be seen that in the boost mode, the asserted boost signal and negated buck signal enables transistor 35, disables transistor 36, and switches transistors 37 and 38 responsively to the PCS signal, thus responsively to the value of the output voltage.

If the value of the input voltage minus the output voltage is greater than the second threshold value but less than the first threshold value, both the boost (BO) and buck (BU) signals are low and controller 25 operates in the buck-boost mode.

Figure 3:
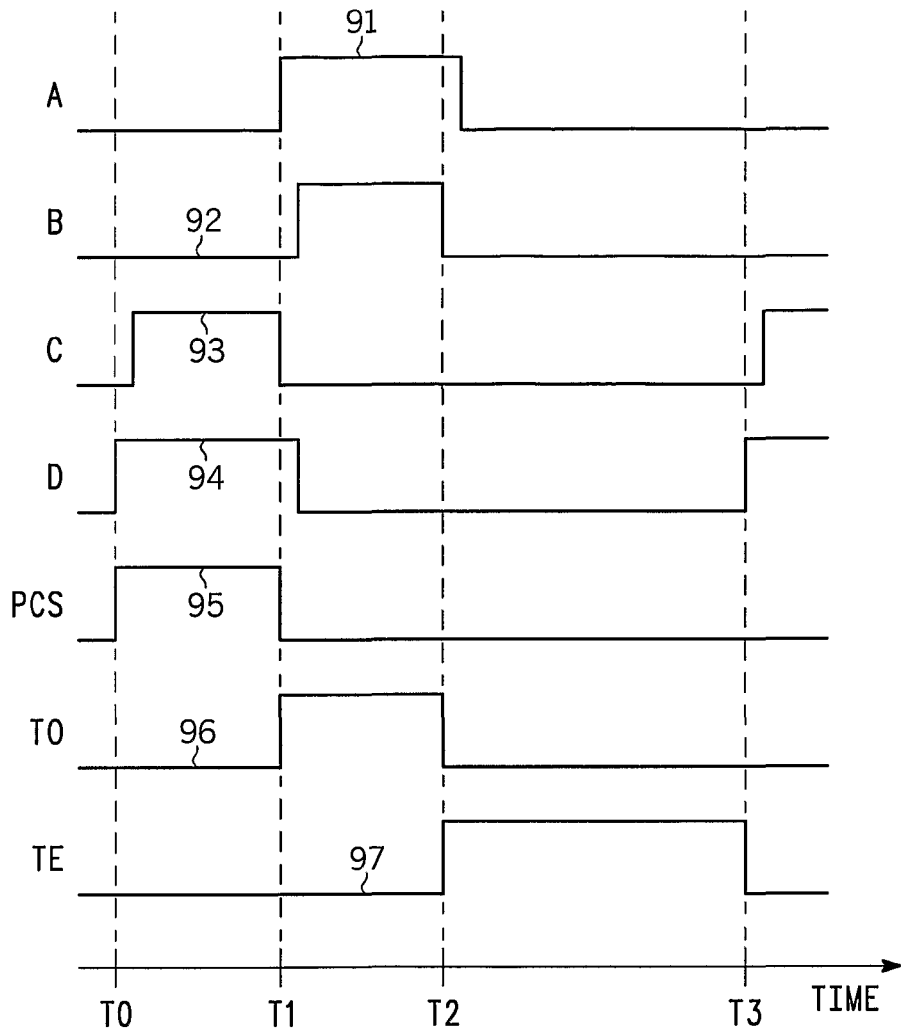
FIG. 3 is a graph having plots that illustrate some of the signals of the buck-boost power supply system of FIG. 1 in accordance with the present invention.

FIG. 3 is a graph having plots that illustrate some of the signals during a portion of the operation of system 10 in the buck-boost mode. The abscissa indicates time and the ordinate indicates increasing value of the signal of the illustrated signal. A plot 91 illustrates the A drive signal on output 86 of block 60. A plot 92 illustrates the B drive signal on output 87 of block 60. A plot 93 illustrates the C drive signal on output 88 of block 60. A plot 94 illustrates the D drive signal on output 89 of block 60. A plot 95 illustrates the PCS signal from PWM control section 53. A plot 96 illustrates the TO signal on output 51 of generator 50 and a plot 97 illustrates the TE signal on output 52 of generator 50. This description has references to FIG. 1, FIG. 2, and FIG. 3.

In the buck-boost mode, controller 25 forms a cycle of the PCS control signal into three portion of a cycle with one portion having a fixed duration. The duration of one portion is controlled responsively to the value of the output voltage, the duration of another portion is fixed, and the duration of the third portion is the remainder of the cycle of the PWM controller, thus, is also responsive to the value of the output voltage. Forming one portion of the cycle to have a fixed duration results in improved operational efficiency. The three phase operation also is easier to implement that prior buck-boost operating modes and reduces the cost of controller 25. As illustrated in FIG. 3, the portion of the cycle between time T0 and T1 is responsive to the value of the output voltage. The portion of the cycle between time T1 and T2 is fixed, and the portion of the cycle between T2 and T3 is the remained of the period of PWM control section 53.

As can be seen in FIG. 2, the low BO and BU signals force the BB signal on the output of gate 62 high. The high from gate 62 enables one input of each of gates 72 and 83. The low BU signal forces the output of inverter 66 high to enable one input of gate 68. The low BU signal also enables one input of gate 77 and forces the output of inverter 76 high to enable one input of gate 80. The low BO signal enables one input of gate 82 and one input of gate 71. The low BO signal also forces the output of inverter 63 high to enable one input of gate 65. When control 53 forces the PCS signal high, the output of gate 67 is forced high thereby forcing the output of gates 68 and 70, thus the D drive signal, high to disable transistor 37. The high from the D signal is received by delay 78 which delays the high before applying it to the input of gate 77 and forcing the output of gate 77 high. The high from gate 77 enables an input of gate 79. The high from gate 67 also forces the output of gates 71 and 69, thus the B drive signal, low and disables transistor 36. The low from the B drive signal is delayed by delay 74 before forcing the output of inverter 75 high. The high from inverter 75 forces the output of gate 79 high. The high from gate 79 forces the output of gates 82 and 80, thus the A drive signal, low thereby enabling transistor 35. The low A drive signal is delayed by delay 61 before forcing the output of inverter 64 and gate 65 high to enable one input of gate 67. The high from gate 79 also forces the output of gate 80, thus the C drive signal, high to enable transistor 38. The high C drive signal is delayed by delay 73 and is then received by gate 67 which has no effect since the output of gate 67 is already high.

Transistors 35 and 38 remained enabled until the sense signal on input 32 forces section 53 to negate the PCS signal. The falling edge of the PCS signal is received by generator 50 which responsively generates the fixed width output pulse of the T0 output signal. The positive going T0 signal is received by gate 84 and forces the output of gate 84 high to enable one input of gate 85. The TE signal is still low to force the output of gate 72 high. The low PCS signal is received by one input of gate 67 which has no effect because the other inputs are high. The low PCS signal also forces the output of gate 79 low thereby forcing the output of gate 80, thus the C drive signal, low and disables transistor 38. The low C drive signal is delayed by delay 73 before enabling another input of gate 67. The low from gate 79 also forces the output of gates 82 and 85, thus the A drive signal, high and enables transistor 35. The high going A drive signal is delayed by delay 61 and then forces the output of inverter 64 and gate 65 low. The low from gate 65 forces the output of gate 67 low since the other inputs are already low. The low from gate 67 forces the output of gates 68 and 70, thus the D drive signal, low to enable transistor 37. The low D drive signal is delayed by delay 78 before forcing the output of gate 77 low which has no effect because the output of gate 79 is already low. The low from gate 67 also forces the output of gates 71 and 69, thus the B drive signal, high to enable transistor 36. The high on output 87 is delayed by delay 74 before being received by gate 79. The low has no effect on gate 79 since other inputs are already low.

As the fixed time period of the T0 signal expires, generator 50 drives the TE signal high and the T0 signal low. The high TE signal forces the output of gates 72 and 69 low. The low from gate 69 forces the B drive signal low and disables transistor 36. The low B drive signal is delayed by delay 74 before driving the output of inverter 75 high which has no effect. The low TE signal forces the output of gates 84 and 85, thus the A drive signal, low to enable transistor 35.

When section 53 drives the PCS signal high to start another cycle of controller 25, generator 50 forces the TO and TE signals high and driver 60 forms drive signals A-D responsively to the PCS, BO, and BU, signals. It can be seen that the delays ensure that the A-D drive signals do not overlap thereby avoiding cross-conduction through transistors 35-38.

As can be seen from the foregoing, controller 25 is configured to couple inductor 14 to receive the input voltage during a first portion of each cycle of the buck-boost mode, to couple inductor 14 to supply power to load 15 during a second portion of each cycle of the buck-boost mode, and to couple inductor 14 to receive the input voltage and to supply power to load 15 during a third portion of each cycle of the buck-boost mode.

In order to implement this functionality for controller 25, an input of detector 40 is connected to input 26 and to a source of transistor 35. A first terminal of resistor 43 is connected to the input of detector 40 and to an inverting input of comparator 41. A second terminal of resistor 43 is commonly connected to an inverting input of comparator 41 and a first terminal of current source 42. A second terminal of current source 42 is connected to a first terminal of current source 46 and to return 27. A second terminal of current source 46 is connected to a non-inverting input of comparator 45 and a first terminal of resistor 47. A second terminal of resistor 47 is connected to a non-inverting input of comparator 41 and to output 31. An output of comparator 41 is connected to the BU input of driver 60 and an output of comparator 45 is connected to a BO input of driver 60. A drain of transistor 35 is commonly connected to a drain of transistor 36 and to input 28. Input 29 is connected to a source of transistor 37 and a drain of transistor 38. A drain of transistor 37 is connected to output 31. A source of transistor 38 is commonly connected to a source of transistor 36 and return 27. Outputs 86, 87, 88, and 89 of driver 60 are connected to the gates of respective transistors 35, 36, 38, and 37. The PCS output of control 53 is connected to the PCS input of driver 60 and an input of generator 50. Outputs 51 and 52 of generator 50 are connected to respective inputs T0 and TE of driver 60. An inverting input of amplifier 55 is connected to input 32 and a non-inverting input of amplifier 55 is connected to receive the reference signal from reference 56. The output of amplifier 55 is connected to an input of control 53. The BO input of driver 60 is commonly connected to a first input of gate 71, an input of inverter 63, a first input of gate 62, and an input of gate 82. The BU input of driver 60 is commonly connected to a second input of gate 62, an input of inverter 66, a first input of gate 77, and an input of inverter 76. The PCS input of driver 60 is connected to a first input of gate 67 and a first input of gate 79. The TO input of driver 60 is connected to a first input of gate 84. The TE input of driver 60 is connected to a first input of gate 72. The output of gate 82 is connected to a second input of gate 72 and a first input of gate 83. The output of inverter 63 is connected to a first input of gate 85 and an output of gate 85 is connected to a first input of gate 67. The output of gate 67 is connected to a first input of gate 68 and second input of gate 71. The output of gate 71 is connected to a first input of gate 69 which has an output commonly connected to output 87 and an input of delay 74. An output of delay 74 is connected to an input of inverter 75 which has an output commonly connected to a second input of gate 79 and to a second input of gate 83. The output of gate 83 is connected to a second input of gate 84 which has an output connected to a first input of gate 85. The output of gate 85 is commonly connected to output 86 and an input of delay 61. The output of delay 61 is connected to an input of inverter 64 which has an output connected to a second input of gate 85. An output of inverter 66 is connected to a second input of gate 68 which has an output connected to a first input of gate 70. An output of gate 72 is commonly connected to a second input of gates 69 and 70. The output of gate 70 is commonly connected to output 89 and an input of delay 78 which has an output connected to a second input of gate 77. The output of gate 77 is connected to a third input of gate 79. The output of gate 79 is commonly connected to a first input of gate 80 and a second input of gate 82. The output of gate 82 is connected to a second input of gate 85. The output of inverter 76 is connected to a second input of gate 80 which has an output commonly connected to output 88 and an input of delay 73. The output of delay 73 is connected to a third input of gate 67.

In one alternate embodiment of system 10, resistor 18 may be replace by a light emitting diode (LED), such as an LED emitting white light. For such an embodiment, there generally would not be a load 15 connected between node 13 and terminal 12.

Figure 4:
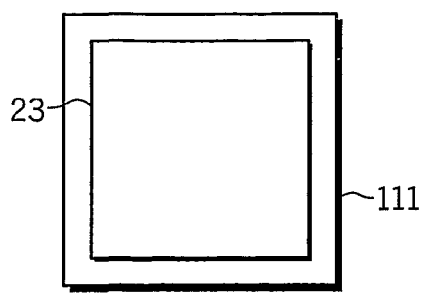
FIG. 4 schematically illustrates an enlarged plan view of a semiconductor device that includes the power controller of FIG. 1 in accordance with the present invention.

FIG. 4 schematically illustrates an enlarged plan view of a portion of an embodiment of a semiconductor device 110 that is formed on a semiconductor die 111. Controller 25 is formed on die 111. Die 111 may also include other circuits that are not shown in FIG. 4 for simplicity of the drawing. Controller 25 and device 110 are formed on die 111 by semiconductor manufacturing techniques that are well known to those skilled in the art.

In view of all of the above, it is evident that a novel device and method is disclosed. Included, among other features, is configuring controller 25 to operate a plurality of switches, such as transistors 35-38, in a buck-boost mode of operation wherein at least one switch of the plurality of switches is enabled for a substantially fixed amount of time for a cycle of the buck-boost mode. This operation of controller 25 has less ripple current thus it is more efficient than prior buck-boost controllers. The configuration of controller 25 also results in less dissipation in the power switches thereby further improving the efficiency. The configuration of controller 25 also allows using a lower saturation current inductor element for inductor 14 thereby facilitating using a smaller less expensive inductor and reducing the costs of a system such as system 10.

While the subject matter of the invention is described with specific preferred embodiments, it is evident that many alternatives and variations will be apparent to those skilled in the semiconductor arts. For example, switching control section 49 is illustrated in an application as a voltage mode controller but section 49 may be used in a variety of controllers including voltage mode controllers and hysteretic controllers as well as current mode controllers. Although controller 25 is illustrated as driving an inductor, those skilled in the art will appreciate that inductor 14 may be replace by a transformer and that resistors 18 and 19 may be replaced by an optical coupler feedback network as is well known in the art. The logic of driver 60 is one exemplary embodiment of logic that provides the desired functionality of section 49. Block 60 may be implemented with other logic configurations. Also, the portions of the buck-boost mode cycle may be portioned differently than by the exemplary illustration of generator 50. Additionally, the word "connected" is used throughout for clarity of the description, however, it is intended to have the same meaning as the word "coupled". Accordingly, "connected" should be interpreted as including either a direct connection or an indirect connection.

The invention claimed is:

1. A method of forming a buck-boost power supply controller comprising:
configuring a switch control section to operate a plurality of switches to control an output voltage wherein the switch control section operates the plurality of switches in one of a buck mode, a boost mode, or a buck-boost mode responsively to a value of the output voltage;
configuring the switch control section to form a cycle of the buck-boost mode into three portions wherein the switch control section is configured to operate the plurality of switches to couple an inductor to receive an input voltage but to not supply power to the output voltage during a first portion of the buck-boost mode cycle, to couple the inductor to supply power to the output voltage but not receive the input voltage during a second portion of the buck-boost mode cycle, and to couple the inductor to both receive power from the input voltage and to couple power to the output voltage during a third portion of the buck-boost mode cycle; and
configuring the switch control section to form no more than one of the first or second or third portions of the cycle with a first duration having a substantially fixed time interval and to form another one of the first or second or third portions of the cycle with a second duration that is formed responsively to a value of the output voltage.

2. The method of claim 1 further including coupling the plurality of switches to drive an inductor.

3. The method of claim 1 wherein configuring the switch control section to operate the plurality of switches includes coupling the plurality of switches in an H-bridge configuration.

4. The method of claim 1 wherein configuring the switch control section includes configuring the switch control section to operate the plurality of switches in a buck operating mode responsively to a first value of the output voltage, to operate the plurality of switches in a boost operating mode responsively to a second value of the output voltage, and to operate the plurality of switches in the buck-boost mode responsively to a third value of the output voltage wherein the second value is greater than the first value and the third value, and wherein the third value is greater than first value.

5. The method of claim 1 wherein configuring the switch control section to operate the plurality of switches includes configuring the switch control section to enable switches of the plurality of switches responsively to the value of the output voltage for the first portion and the second portion of the cycle of the buck-boost mode and to operate the at least one switch of the plurality of switches for the substantially fixed portion of the cycle for the third portion of the cycle of the buck-boost mode.

6. The method of claim 5 further including configuring the switch control section to form the third portion following the first portion and preceding the second portion.

7. The method of claim 1 wherein configuring the switch control section to operate the plurality of switches includes configuring the power supply controller to form the substantially fixed portion of the cycle to be substantially a fixed amount of time approximately equal to 25% of a switching period.

8. The method of claim 1 further including
configuring the switch control section to form yet another one of the first or second or third portions of the cycle with a third duration that is a remainder of the cycle responsively to termination of both the first and second durations.

9. A method of forming a buck-boost power supply controller comprising:
configuring the buck-boost power supply controller to couple an inductor to receive an input voltage during a first portion of a buck-boost mode;
configuring the buck-boost power supply controller to couple the inductor to supply power to a load during a second portion of the buck-boost mode; and
configuring the buck-boost power supply controller to couple the inductor to receive the input voltage and to supply power to the load during a third portion of the buck-boost mode; and
configuring the switch control section to form no more than one of the first or second or third portions of the cycle with a first duration having a substantially fixed time interval and to form another one of the first or second or third portions of the cycle with a second duration that is formed responsively to a value of an output voltage.

10. The method of claim 9 wherein configuring the buck-boost power supply controller to couple the inductor to receive the input voltage during the first portion of the buck-boost mode includes configuring the buck-boost power supply controller to couple an input terminal of the inductor to receive the input voltage and to decouple an output terminal of the inductor from the load.

11. The method of claim 9 wherein configuring the buck-boost power supply controller to couple the inductor to supply power to the load during the second portion of the buck-boost mode includes configuring the buck-boost power supply controller to decouple an input terminal of the inductor from the input voltage and to couple an output terminal of the inductor to the load during the second portion of the buck-boost mode.

12. The method of claim 9 wherein configuring the buck-boost power supply controller to couple the inductor to receive the input voltage and to supply power to the load during a third portion of the buck-boost mode includes configuring the buck-boost power supply controller to couple an input terminal of the inductor to receive the input voltage and to couple an output terminal of the inductor to supply power to the load during the third portion of the buck-boost mode.

13. The method of claim 9 further including configuring the buck-boost power supply controller to form one of the first portion, the second portion, or the third portion as a fixed portion of a period of a cycle of the buck-boost mode.

14. The method of claim 13 further including configuring the buck-boost power supply controller to form one of the first portion, the second portion, or the third portion to have a duration responsive to a sense signal that is representative of an output voltage controlled by the buck-boost power supply controller.

15. The method of claim 13 wherein configuring the buck-boost power supply controller to form one of the first portion, the second portion, or the third portion as the fixed portion of a period of the cycle of the buck-boost mode includes configuring the buck-boost power supply controller to form one of the first portion, the second portion, or the third portion to have a duration that is a fixed amount of time.

16. The method of claim 9 further including configuring the buck-boost power supply controller to enable a first switch to couple the inductor to receive the input voltage for the first portion of the buck-boost mode, to enable a second switch to couple the inductor to supply power to the load for the second portion of the buck-boost mode, and to enable the first switch and the second switch for the third portion of the buck-boost mode.

17. The method of claim 16 wherein configuring the buck-boost power supply controller to enable a first switch to couple the inductor to receive the input voltage for the first portion of the buck-boost mode, to enable a second switch to couple the inductor to supply power to the load for the second portion of the buck-boost mode, and to enable the first switch and the second switch for the third portion of the buck-boost mode includes configuring the buck-boost power supply controller to enable the first switch to couple the inductor to receive the input voltage for the first portion of each cycle of the buck-boost mode, to enable the second switch to couple the inductor to supply power to the load for the second portion of each cycle of the buck-boost mode, and to enable the first switch and the second switch for the third portion of each cycle of the buck-boost mode.

18. The method of claim 9 further including configuring the buck-boost power supply controller to operate in a buck operating mode or a boost operating mode or the buck-boost mode responsively to a difference between a value of the input voltage and a value of an output voltage that is controlled by the buck-boost power supply controller.

19. The method of claim 9 further including
configuring the switch control section to form yet another one of the first or second or third portions of the cycle with a third duration that is a remainder of the cycle responsively to termination of both the first and second durations.

20. A buck-boost mode power supply controller comprising:
a detector configured to form a first control signal responsive to a first difference between an output voltage controlled by the buck-boost power supply controller and an input voltage supplied to the buck-boost power supply controller, and to form a second control signal responsive to a second value of the difference between the output voltage and the input voltage;
a PWM control section configured to form a PWM control signal responsive to a value of the output voltage; and
a switch control section configured to control a plurality of switches to regulate the output voltage and to enable one switch of the plurality of switches for a fixed portion of a cycle of the PWM control signal responsively to a third difference between the output voltage and the input voltage wherein the third difference is greater than the first difference and less than the second difference.

21. The buck-boost mode power supply controller of claim 20 wherein the switch control section is configured to enable a first switch of the plurality of switches and a second switch of the plurality of switches under control of the output voltage responsively to the first control signal and enable the second switch and switches the first switch under control of the output voltage responsively to the second control signal.

22. The buck-boost mode power supply controller of claim 20 wherein the switch control section configured to control the plurality of switches to regulate the output voltage and to enable one switch of the plurality of switches for the fixed portion of the cycle includes the switch control section configured to form the fixed portion of the cycle as a fixed period of time.

* * * * *